United States Patent [19]

Seibert et al.

[11] Patent Number: 5,126,385
[45] Date of Patent: Jun. 30, 1992

[54] CHLOROPYRIMIDINES AND CHLOROTRIAZINES AS RUBBER-TO-METAL ADHESION PROMOTERS

[75] Inventors: Rebecca F. Seibert, Naugatuck; Edward L. Wheeler, Watertown; Franklin H. Barrows, Waterbury; William R. True, Wolcott, all of Conn.

[73] Assignee: Uniroyal Chemical Company, Inc., Middlebury, Conn.

[21] Appl. No.: 496,483

[22] Filed: Mar. 20, 1990

[51] Int. Cl.$^5$ .................. C08K 5/3462; C08K 5/3492
[52] U.S. Cl. ...................... 524/100; 524/102
[58] Field of Search ................. 524/100, 102

[56] References Cited

U.S. PATENT DOCUMENTS

| | | |
|---|---|---|
| 3,379,676 | 4/1968 | Ashton et al. ............ 524/100 |
| 3,828,002 | 8/1974 | Westlinnine et al. ...... 524/100 |
| 3,894,903 | 7/1975 | Brooks et al. ............ 156/306 |
| 3,905,947 | 9/1975 | Cowell et al. ............ 525/147 |
| 3,991,130 | 11/1976 | Cowell et al. ............ 525/343 |
| 4,069,380 | 1/1978 | Eaton et al. ............. 544/212 |
| 4,347,290 | 8/1982 | Haemers ................. 428/625 |
| 4,521,558 | 6/1985 | Mowdood ................. 524/145 |

FOREIGN PATENT DOCUMENTS 922040 3/1963 United Kingdom .

*Primary Examiner*—Paul R. Michl
*Assistant Examiner*—Peter Szekely
*Attorney, Agent, or Firm*—Raymond D. Thompson

[57] ABSTRACT

This invention relates to the improvement of rubber-to-metal adhesion and adhesion retention in sulfur vulcanizable, metal reinforced rubber compositions via the use of certain phenylenediamino substituted chloropyrimidine and chlorotriazine adhesion promoters.

12 Claims, No Drawings

CHLOROPYRIMIDINES AND CHLOROTRIAZINES AS RUBBER-TO-METAL ADHESION PROMOTERS

TECHNICAL FIELD

The present invention is directed toward improving the adhesion and adhesion retention between rubber compositions, such as those used in the manufacture of tires, conveyor belts, hoses and the like and brass coated wire or cable which is embedded in the stock.

The improved useful life of modern rubber compositions, especially in belting and tire end uses via more sophisticated and effective antiozonant/antioxidant packages have necessitated the desirability of adding materials to the rubber compositions to improve useful article life and service through increased reinforcing agent adhesion and adhesion retention. Improved adhesion between rubber and brass coated wire is obtained according to the present invention.

BACKGROUND ART

It is often desirable to reinforce rubber articles by incorporating therein metal reinforcing elements. For example, tires, conveyor belts, power transmission belts, timing belts, hoses and a variety of other rubber articles are often reinforced with metal wire. In order for rubber articles which are provided with steel reinforcing elements to function effectively, it is important that good adhesion between the rubber and the metal reinforcing elements be maintained. One of the most common methods of enhancing the adhesion of wire filaments to rubber is to coat the filament with another material, for example, pneumatic vehicle tires are often reinforced with cords prepared from steel filaments which are coated with brass. Normally, steel reinforcing elements are coated with a brass that is an alloy of copper and zinc. However, ternary brass alloys that are useful for coating steel reinforcing elements are also known by those skilled in the art. For example, U.S. Pat. No. 4,347,290 discloses a ternary brass alloy which contains copper, zinc and cobalt. These and other ternary alloys, such as those containing copper, zinc and iron or tin are known to be effective in improving rubber to metal adhesion.

It is also known that various agents can be mixed into the rubber which will increase adhesion between the rubber and metal reinforcements embedded in it. U.S. Pat. No. 3,894,903 discloses a process for improving the bonding of rubber to copper and copper alloys by incorporating into the rubber before vulcanization certain triazines, for example 2-(3-hydroxyphenoxy)-4-chloro-6-aminotriazine.

U.S. Pat. Nos. 3,991,130 and 3,905,947 disclose a method for improving adhesion between vulcanizable elastomeric compositions and metal surfaces by incorporating into the elastomer an organo-nickel salt and then subsequently vulcanizing the elastomeric composition while it is in contact with the metal surface.

U.S. Pat. No. 4,521,558 improves rubber adhesion to metal via the use of allyl phosphite and phosphate esters and various iminodiacetic acids and salts.

Cobalt complexes such as cobalt-mercaptobenzothiazole complexes as disclosed in UK Patent No. 914,787 have been used in natural and synthetic rubbers both as accelerators and to permit the rubber to be bonded more effectively to ferrous metals during vulcanization.

Peroxide initiated curing systems for rubbery materials have proven to be unsatisfactory in the production of finished articles that are required to have extended flex life, for peroxide cured rubbers tend to crack when subject to repeated flexing. Additionally, peroxide curing systems tend to be expensive and because of their reactivity, they require careful handling to avoid the creation of a dangerous environment.

As a result, many industries, such as the tire and industrial belting industries prefer to use sulfur cure vulcanization systems for cross-linking rubber.

SUMMARY OF THE INVENTION

This invention reveals the use of chloropyrimidines and chlorotriazines in sulfur curable rubber-metal composites to increase the adhesion and adhesion retention between the metal and the rubber composition. Furthermore, most of the chloropyrimidines and chlorotriazines of this invention do not negatively affect the processing or cured properties of the systems as is often the case with previous adhesion promoters. As a result of the retention of the inherently desirable properties of the system, the composites are useful in finished goods requiring long life, such as tires or industrial belting.

More specifically, this invention discloses a composite comprising a sulfur curable rubber composition with brass coated metal wire embedded therein wherein said rubber composition contains from about 0.05 to about 20 parts per hundred parts of rubber of at least one adhesion promoter selected from mono-,di- and tri-chloropyrimidines and mono and di-chlorotriazines according to Structure (I) below.

DETAILED DESCRIPTION OF THE INVENTION

This invention relates to sulfur curable rubber compositions reinforced with brass coated metal wherein the composition contains certain chloropyrimidine and chlorotriazine adhesion promoters and composite articles made therefrom. The compounds useful as adhesion promoters are those represented by structural formula (I) below:

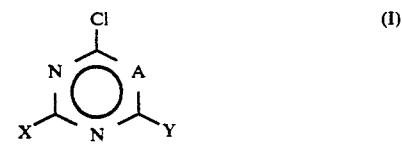

A is —N, C—H, C—Cl;

Y is

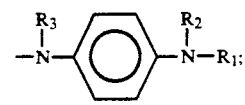

provided that when A is —N, then X is —SH, —NH$_2$, —NHR$_4$, Cl or

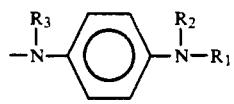

when A is C—H or C—Cl, Y may also be Cl only when X is

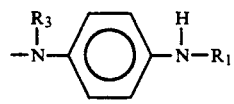

wherein $R_1$ is $C_3$-$C_{12}$ alkyl or phenyl or $C_1$-$C_{12}$ alkyl-substituted phenyl;

$R_2$ is H,

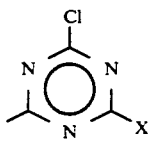

$R_3$ is H, $C_3$-$C_{12}$ alkyl $R_4$ is $C_1$-$C_{12}$ alkyl

Generally favorable adhesion results are obtained with Compound (I) wherein A is N or C—H and Y is

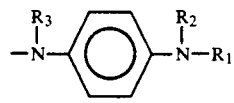

and

X is Cl.

Preferred compounds of Structure (I) are those where A is N and $R_2$ is dichlorotriazinyl.

More preferred compounds are those where A is N, X is Cl and Y is $C_3$-$C_{12}$ alkyl substituted; phenyl substituted or dichlorotriazinyl substituted p-phenylenediamino.

Most preferred are those compounds where A is N, X is Cl and Y is an N-phenyl-p-phenylene diamino group. Of course, mixtures of more than one of the compounds of structure (I) may also be used. The following compounds represent preferred compounds of Structure (I) exhibiting good wire adhesion results.

ENCOMPASSED BY STRUCTURE (I).

5-Chloro-2,4,6-tris(N-1,4-dimethylpentyl-p-phenylenediamino)pyrimidine

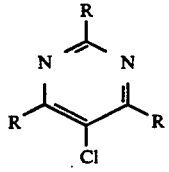

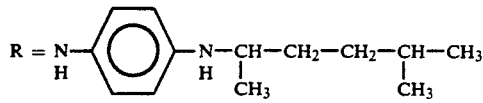

-continued 2,4-Dichloro-6-(N-1,4-dimethylpentyl-p-phenylenediamino)pyrimidine and 4,6-Dichloro-2-(N-1,4-dimethylpentyl-p-phenylenediamino)pyrimidine

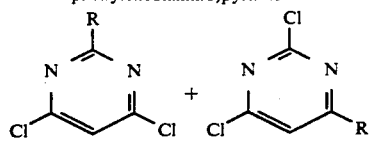

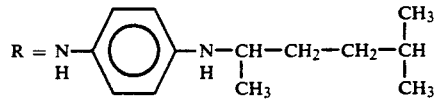

4,5,6-Trichloro-2-(N-1,4-dimethylpentyl-p-phenylenediamino)pyrimidine

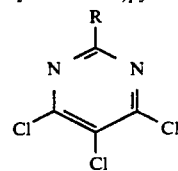

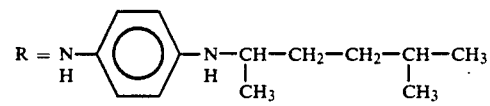

2-Chloro-4,6-bis(N-1,4-dimethylpentyl-p-phenylenediamino)-1,3,5-triazine

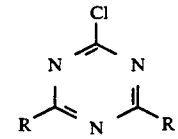

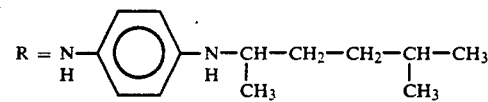

2-Chloro-4,6-bis(N-sec-butyl-p-phenylenediamino)-1,3,5-triazine

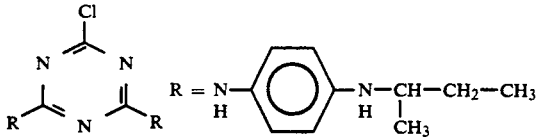

2-Chloro-4,6-bis(N-phenyl-p-phenylenediamino)-1,3,5-triazine

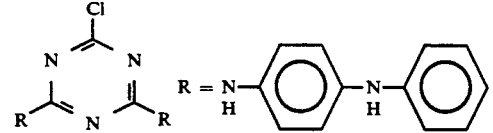

2,4-Dichloro-6-(N-phenyl-p-phenylenediamino)-1,3,5-triazine

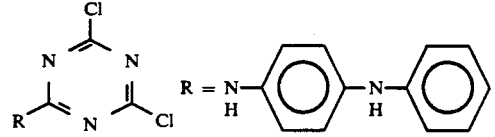

N,N'-bis(4,6-dichloro-1,3,5-triazinyl-2)-N-1,4-dimethylpentyl-p-phenylene-diamine -continued

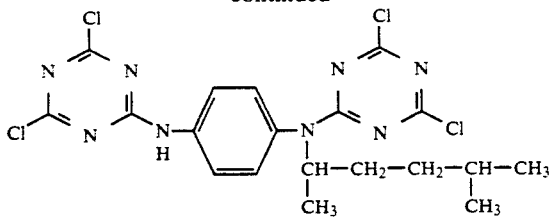

The rubber in the composites of this invention can be selected from a wide variety of rubbery polymers for the instant adhesion promoters are effective in both natural and synthetic rubbers that are sulfur curable.

Some representative examples of rubbers commonly used in the composites of this invention include unsaturated elastomers such as natural rubber, styrene-butadiene rubber, synthetic polyisoprene, polychloroprene, cyclene rubbers, polybutadiene, nitrile rubbers, carboxylated nitrile rubbers, butyl rubbers, EPDM (ethylene-propylene-diene) rubbers, epichlorohydrin homo and copolymers, EPR (ethylene- propylene) rubbers, polyisobutylene, norbornene rubbers, polysulfide rubbers, and blends of various combinations of these and other diene rubbers.

The curative systems employed in the cross-linking of the compositions of this invention comprise sulfur and/or a sulfur donor compound and preferably, at least one sulfur cure accelerator.

The sulfur donor compounds which may be employed in conjunction with or in the alternative to sulfur are well known to those skilled in the art of rubber compounding. Illustrative of such sulfur donor compounds are 2-(4-morpholinodithio)benzothiazole, 4,4-dithio-dimorpholine, N,N'-caprolactam disulfide and the like.

The sulfur cure accelerators which may be employed include thioureas, such as N,N'-dibutylthiourea, 2-mercaptoimidazoline, tetramethylthiourea and the like; guanidine derivatives, such as N,N'-diphenylguanidine and the like; heterocyclics, such as mercaptobenzimidazole, mercaptobenzothiazole, 2,2.-dibenzothiazyl disulfide, zinc 2-mercaptobenzothiazole and the like; and sulfenamides, such as N-oxydiethylene-2-benzothiazolesulfenamide, N-t-butylbenzothiazolesulfenamide, N-cyclohexyl-2-benzothiazolesulfenamide, N,N-diisopropyl-2-benzothiazolesulfenamide and the like. Moreover, mixtures of two or more sulfur cure accelerators may be employed in the curing agent of this invention. The preferred accelerators are thiazoles and sulfenamides, with sulfenamides being particularly preferred.

The sulfur cure accelerator is generally present in amounts of between about 0.1 parts and about 5 parts per 100 parts of rubber, with preferably between about 0.3 part and about 3.0 parts of accelerator per 100 parts of rubber being present. Most preferably, between about 0.3 parts and about 2.0 parts of accelerator per 100 parts of rubber are employed.

Generally, between about 0.2 and about 10, preferably between about 3.0 and about 8.0 parts of sulfur per hundred parts of rubber are employed.

Many terms are used to describe the metal reinforcing elements used to strengthen rubber articles. The terms "cord", "tire cord", "cable", "strand", "wire", "rod", "plate", and "filament" can all be used to describe metal reinforcing elements used to strengthen rubber articles. The term "metal reinforcement" as used herein is devised to be generic to all articles for reinforcing rubber articles including those listed above. Thus, without being limited thereto, a metal reinforcement can be a metal wire, metal cord, a metal tire cord, a metal cable, a metal strand, a metal rod, a metal plate or a metal filament.

The metal reinforcement elements which are generally preferred for use in this invention are brass plated steel.

Metal wires used in the tire industry are manufactured by cold drawing high carbon steel and subsequently brass plating same. The brass plating not only enhances the adhesion of the wire cord to rubber but also facilitates drawing the wire to a fine diameter of about 0.20 mm. The wire filaments are combined to form a strand and several strands combined to obtain the final tire cord.

The adhesion promoters of this invention are the mono-,di- and trichloropyrimidines and mono-and dichlorotriazines Structure (I). Preferred are the chlorotriazines either alone or in combination with various commercially available bonding agents such as the cobalt salts, e.g., cobalt stearate which is widely used in the tire industry; 2,3,5,6-tetrachloro-1,4-benzoquinone (sold by Uniroyal Chemical under the trademark VULKLOR); and various resorcinol/formaldehyde donors and resorcinol derivatives well known to the art. These systems are discussed in Encyclopedia of Chemical Technology ,vol. 20, pp. 365–468, 3rd edition (1982) and S. Buchan "Rubber to Metal Bonding", Crosby Lockwood and Sons London 1959 both of which are incorporated by reference.

The adhesion promoters of this invention can be mixed into a rubber using ordinary compounding techniques. Generally, it will be convenient to mix the adhesion promoter into the rubber composition of this invention simultaneously with other desired compounding ingredients using any suitable mixing equipment known to those skilled in the art, such as an internal mixer or mill. Normally, the rubber compositions used in the composites of this invention will be compounded with sulfur and carbon black. Numerous mineral fillers, such as clay and silica are commonly used as partial or total replacements for carbon black. The rubber compositions of this invention will also commonly contain cure accelerators, scorch inhibitors, antidegradents, pigments, and processing oils.

The essence of the present invention also finds utility in, for example, other rubber articles bonded to brass or brass-plated steel such as motor mounts, cutless bearings, springs, power belts, printing rolls, metal wire reinforced or braided hose, and wherever it is desired to secure rubber to metal or provide a flexible and strong, thermally stable bond between same.

The rubber articles of this invention can be produced by following a procedure which comprises: 1) preparing a rubber composition which contains at least one adhesion promoter of this invention, 2) surrounding the metal reinforcement with the rubber to conform to the desired shape of the rubber article being produced, and 3) curing (vulcanizing) the rubber article. Vulcanization of the blends may be carried out in a Press, an oven, or other suitable means until crosslinking has occurred to a satisfactory state of cure.

Thus, the standard techniques well-known to those skilled in the art for manufacturing rubber articles with metal reinforcing elements embedded therein can be employed in this invention. In other words, metal reinforcements can be incorporated into the rubber articles of this invention using the same techniques that are employed in incorporating metal reinforcements into ordinary rubber articles. Generally, reinforcing elements are simply surrounded by uncured rubber containing an adhesion promoter of this invention in a mold and vulcanized to produce the desired rubber article which has the metal reinforcement embedded therein.

In the practice of this invention generally from about 0.05 to about 20 parts per hundred parts of rubber by weight (phr) of the adhesion promoter will be employed in the rubber composition. It is generally preferred for 0.1 to 10 parts of adhesion promoter to be employed in the rubber composition per hundred parts of rubber by weight. It is more preferred for 0.5 to 6 phr of an adhesion promoter to be employed in the rubber composition. It should be noted that various blends of different adhesion promoters can be employed in the rubber compositions of this invention.

The adhesion promoters described herein can be distributed (mixed) throughout a rubber using any convenient, technique known to those skilled in the art. The rubber compositions of this invention are also cured using standard techniques well known to those skilled in the art. Generally, such rubber compositions are cured (vulcanized) under pressure at a temperature ranging from about 100° C. to about 233° C. with a metal reinforcement being embedded in the rubber composition so as to form a composite article. It is generally preferred for such composite articles to be cured at a temperature ranging from 100° C. to 205° C.

The practice of the present invention has been observed to result in improved aged rubber-metal adhesion, in many cases with improved initial (original) adhesion. The following examples are included to further illustrate the rubber-metal composites within the scope of this invention and to compare them with other rubber-metal composites outside of its scope. Such comparisons clearly show the superior adhesion retention obtained by practicing the present invention. The following examples are merely for the purpose of illustration and are not to be regarded as limiting the scope of the invention or the manner in which it can be practiced. Unless specifically indicated otherwise, all parts and percentages are given by weight.

The chloropyrimidines and chlorotriazines of the invention may be synthesized by a suitable synthesis route. The following synthesis examples are provided to illustrate a currently preferred method of manufacturing certain of the class of chloropyrimidine and chlorotriazine compounds of the invention.

SYNTHESIS EXAMPLES

EXAMPLE 1 (AP-6)

Mixture of 2,4-Dichloro-6-(N-1,4-dimethylpentyl-p-phenylenediamino) pyrimidine, and 4,6-Dichloro-2-(N-1,4-dimethylpentyl-p-phenylenediamino) pyrimidine In a 500 milliliter, three-necked, round-bottom flask equipped with a thermometer, a mechanical stirrer, and a dropping funnel was placed a solution of 18.4 grams (0.1 mole) of 2,4,6-trichloropyrimidine in 100 ml. of toluene. The temperature of the solution was adjusted to −5° C. and a solution of 21.7 grams (.1 mole) of 95 percent pure N-(1,4-dimethylpentyl) ½ p phenylenediamine in 50 ml. of toluene was added over hour period as the reaction temperature was held between −10° to −5° C. Over 1.5 hours the reaction mixture was heated to 50° C. and held for 4 hours. The reaction was followed by high performance liquid chromatography by observing the disappearance of the starting amine, and the formation of the title compounds. After cooling to room temperature, the hydrochlorides of the title compounds precipitated and were removed by filtration. The hydrochlorides and 200 ml. of toluene were charged back to the reaction flask, and neutralized with a 25 percent sodium hydroxide solution. The water layer was removed, and discarded. The title compounds precipitated, and were isolated by filtration, and after recrystallization from toluene melted at 122–125° C. The yield was 62.3 percent. The infrared spectrum was consistent with the structure. Relative area HPLC analysis of the two isomers total 97.2 percent purity.

EXAMPLE 2

4,5,6-Trichloro-2-(N-1,4-dimethylpentyl-p-phenylenediamino)pyrimidine

The procedure of Example 1 was repeated except that acetonitrile was used as the reaction solvent, and tetrachloropyrimidine was used in place of 2,4,6-trichloropyrimidine to produce the title compound, isolated as an oil. The yield was 38.7 percent. The infrared spectrum was consistent with the structure. Relative area HPLC analysis of the product showed it to be 95.7 percent pure.

EXAMPLE 3 (AP-3)

2-Chloro-4,6-bis(N-1,4-dimethylpentyl-p-phenylenediamino) 1,3,5-triazine

In a three liter three-necked, round-bottomed flask equipped with a thermometer, a mechanical stirrer, and a dropping funnel was placed 900 ml. of isopropanol. The isopropanol was cooled to −5° C. and 92.2 grams (0.5 mole) of cyanuric chloride was added. To this stirred suspension was added 206 grams (1 mole) of N-(1,4-dimethylpentyl)-p-phenyledenediamine dropwise over 2.5 hour period keeping the temperature between −5° and 0° C. Over 1.5 hours the reaction mixture was warmed to 25° C. then held for 2 hours at 25° C. The reaction was followed by high performance liquid chromatography by observing the disappearance of the starting amine, and the conversion of the intermediate mono-substituted compound to the final bis-substituted product. The dihydrochloride of the title compound precipitated, and was removed by filtration. The dihydrochloride was charged back to the reaction flask and 1000 ml. of isopropanol was added. The dihydrochloride was neutralized with a 12.5 percent sodium hydroxide solution. The title compound precipitated, and was isolated by filtration, m.p. 102–106° C. The yield was 69.2 percent. The infrared spectrum was consistent with the structure. Relative area HPLC analysis of the product showed it to be 92.6 percent pure.

EXAMPLE 4 (AP-4)

2-Chloro-4,6-bis(N-phenyl-p-phenylenediamino)-1,3,5-triazine

The procedure of Example 3 was repeated, except N-phenyl-p-phenylenediamine was used to produce the title compound, m.p. 205–207° C. The yield was 94.2 percent. The infrared spectaum was consistent with the structure. Relative area HPLC analysis of the product showed it to be 96.7 percent pure.

EXAMPLE 5 (AP-1)

2,4-Dichloro-6-(N-phenyl-p-phenylenediamino)-1,3,5-triazine

In a two liter, three-necked, round-bottom flask equipped with a thermometer, a mechanical stirrer, and a dropping funnel was placed a solution of 95 grams (0.5 mole) of 97 percent cyanuric chloride in 500 ml. of toluene. The temperature of the solution was adjusted to 5° C., and a solution of 92 grams (0.5 mole) of N-phenyl-p-phenylenediamine in 200 ml. of toluene was added over 1 hour period at 5° C. Over 1 hour, the reaction mixture was warmed to 20° C. The reaction was followed by high performance liquid chromatography by observing the disappearance of the starting amine, and the formation of the mono-substituted product. The reaction temperature was adjusted to 10° C., and the hydrochloride of the title compound was neutralized with a 16.7 percent sodium hydroxide solution. The title compound precipitated, and was isolated by filtration, m.p. 145°–147° C. The yield was 75.9 percent. The infrared spectrum was consistent with the structure. Relative area HPLC analysis of the product showed it to be 96.0 percent pure.

EXAMPLE 6

N-Phenyl-N,N'bis(4,6-dichloro-1,3,5-triazinyl-2)-p-phenylenediamine

In a two liter, four-necked, round-bottom flask equipped with a thermometer, a condenser, a mechanical stirrer, and a dropping funnel was placed a solution of 142.3 grams (0.75 mole) of 97 percent cyanuric chloride in 700 ml. of xylene. The temperature of the solution was adjusted to 0° C., and a solution of 55.2 grams (0.3 mole) of N-phenyl-p-phenylenediamine in 200 ml. of xylene was added over 1 hour period at 5° C. The reaction mixture was heated, and refluxed for 5 hours at about 140° C. The reaction was followed by high performance liquid chromatography by observing the disappearance of the starting amine, and the conversion of the intermediate dichlorotriazine to the final tetrachloro compound. During the reflux period hydrogen chloride was evolved from the reaction. The reaction mixture was concentrated to a volume of 700 ml. then, diluted with an equal volume of hexane. The title compound precipitated, and was isolated by filtration, m.p. 224°–228° C. The yield was 67.4 percent. The infrared spectrum was consistent with the structure. Relative area HPLC analysis of the product showed it to be 93.6 percent pure.

EXAMPLE 7 (AP-2)

N-1,4-Dimethylpentyl-N,N'bis(4,6-dichloro-1,3,5-triazinyl-2)-p-phenylene diamine The procedure of Example 6 was repeated except N-(1,4-dimethylpentyl)-p-phenylenediamine was used to produce the title compound, m.p. 171°–173° C. The yield was 67.3 percent. The infrared spectrum was consistent with the structure. Relative area HPLC analysis of the product showed it to be 95.9 percent pure.

EXAMPLE 8 (AP-5)

2-Chloro-4,6-bis(N-sec-butyl-p-phenylenediamino)-1,3,5-triazine

In a two liter three-necked, round-bottom flask equipped with a thermometer, a mechanical stirrer, and a dropping funnel was placed a solution of 88.5 grams (0.5 mole) of 92.7 percent N-sec-butyl-p-phenylenediamine in 265.5 grams of isobutanol. The temperature of the solution was adjusted to 10° C. and 95 grams (0.5 mole) of 97 percent cyanuric chloride was added over 1.33 hours at 10° C. Next a solution of 88.5 grams (0.5 mole) of 92.7 percent N-(sec-butyl)-p-phenylenediamine in 265.5 grams of isobutanol was added over 1 hour period at 10° C. Over 2 hours the reaction mixture was heated to 30° C., and held for 2.5 hours at 30° C. The reaction was followed by high performance liquid chromatography by observing the disappearance of the starting amine, and the conversion of the intermediate mono-substituted compound to the final bis-substituted product. The dihydrochloride of the title compound was neutralized by adding a 13.3 percent sodium hydroxide solution. The aqueous layer was removed and discarded. The isobutanol layer was extracted with water, and vacuum stripped. The title compound was crystallized from hexane, and isolated by filtration, m.p. 147.5°–149° C. The yield was 50 percent. Relative area HPLC analysis of the product showed it to be 83.4 percent pure.

ADHESION PROMOTER UTILITY EXAMPLES 9–14 AND COMPARATIVE EXPERIMENTS A AND B [OF TABLE I]
All of the examples of Table I utilize a Masterbatch of the following recipe:

| Weight | Parts by |
|---|---|
| Rubber | |
| Natural Rubber (SMR 5CV) | 80.00 |
| Polybutadiene | 20.00 |
| Carbon Black | 55.00 |
| Zinc Oxide | 10.00 |
| Stearic Acid | 1.50 |
| Aromatic Oil | 7.00 |
| Tackifier Resin | 2.00 |
| Diphenylamine/Acetone Reaction Product Antioxidant | 1.50 |
| N-phenyl-N'-(1,3-dimethylbutyl)-p-phenylenediamine Antiozonant | 1.00 |
| Total | 178.00 |

ADHESION PROMOTER UTILITY EXAMPLES 15–17 AND COMPARATIVE EXAMPLES A' AND B' [OF TABLE II]
All of the examples of Table II utilize a masterbatch of the following recipe.

| Weight | Parts by |
|---|---|
| Rubber | |
| Natural Rubber (SMR 5CV) | 100.0 |
| Carbon Black | 55.0 |
| Zinc Oxide | 7.0 |
| Stearic Acid | 2.0 |
| Naphthenic Oil | 6.0 |
| Antiozonant N-phenyl-N'-(1,3-dimethylbutyl)-p-phenylenediamine | 2.0 |
| Total | 172.00 |

The Masterbatch is prepared by mixing the rubber in an internal mixer and after one minute adding the zinc oxide and one-half of the carbon black. After three minutes, the balance of the ingredients is added. The unit is "swept-down" at five minutes and the material discharged at seven minutes at from about 122° C. to about 150° C.

Two such batches as described above are prepared and milled together to realize the final Masterbatch.

Employing the ingredients indicated in Table I (which are listed in parts per hundred of rubber by weight), several rubber compositions were compounded in the following manner: one half of the Masterbatch, bonding agent, adhesion promoter, accelerator, sulfur and balance of the Masterbatch are added sequentially to an internal mixer and subsequently discharged at 100° C. Each example is then mill blended for five minutes.

Test samples of each of the composition examples, which are similar to commercial tire breaker compositions were molded and cured according to specifications given in ASTM D-1871.

Oven agings for two days at 121° C. and three day steam aging Wire Adhesion Tests were conducted according to modified ASTM D-2229, "Adhesion To Steel Cord" with Newtons to pull-out measured at 121° C. The adhesion pads were cured for 40 minutes at 160° C. using 2×2 brass coated steel wire.

The modification of ASTM D-2229 consisted of using specifically a Chatillon movable stage and digital force gauge. The bottom grip holds the block of rubber firmly in place. The top grip holds the wire firmly in place. The bottom grip is mounted to a stage that lowers itself, exerting tension between the ripped wire and the block in which it is embedded. The digital force gauge attached to the top grip that holds the wire measures the force necessary to pull the wire from the block in which it is embedded.

The wire adhesion data for each example shows the force in Newtons necessary to pull or remove the brass coated steel reinforcing wire from a 25.4 mm embedment in the vulcanized pad at a rate of 50.8 mm/minute.

This "pull-out" force is followed (in the aged and/or steamed samples) by the percentage of original force retained. Finally, the amount of rubber remaining on the wire was determined by visual examination and has been reported as percent retained rubber coverage, wherein 5 represents 100% coverage; 2 represents 40% coverage; etc.

The rubber coverage measurement is significant in that it visually represents the adhesion of the rubber composition to the brass plated steel cord. As is well known to those skilled in the art, the amount of rubber adhering to the steel cord after it has been pulled from a cured adhesion pad represents the relationship of the adhesive force attaching the rubber composition to the surface of the steel cord and the tear strength of the rubber composition itself. Large percentages of rubber coverage indicate that the adhesion to the steel cord exceeds the internal strength of the rubber composition itself, i.e., tear strength. Therefore, when the rubber coverage is very high it can be concluded that the metal to rubber adhesion is greater than the force measured to pull the steel cord out of the rubber pad since the force measured was a result of the rubber composition rupturing and not the metal to rubber interface.

Normal or unaged testing is merely a measurement of the initial adhesion properties between the rubber composition and the metallic reinforcement. Steam aging is an accelerated humidity aging test and is significant in determining the chemical stability of the chemical bonds formed between the rubber composition and the metallic reinforcement when exposed to moisture or steam.

TABLE I

| | Example or Comparative Experiment | | | | | | | |
|---|---|---|---|---|---|---|---|---|
| | A | B | 9 (AP-1) | 10 (AP-2) | 11 (AP-3) | 12 (AP-4) | 13 (AP-5) | 14 (AP-6) |
| Masterbatch | 178.0 | 178.0 | 178.0 | 178.0 | 178.0 | 178.0 | 178.0 | 178.0 |
| Cobalt Stearate | 2.0 | — | — | — | — | — | — | — |
| Vulklor[1] | — | 1.0 | — | — | — | — | — | — |
| Adhesion Promoter (AP)[2] | — | — | 2.0 | 2.0 | 2.0 | 2.0 | 2.0 | 2.0 |
| Bonding Agent R-6[3] | — | 2.0 | 2.0 | 2.0 | 2.0 | 2.0 | 2.0 | 2.0 |
| Resin 1588 | 2.0 | — | — | — | — | — | — | — |
| 2-Nitro-2-methyl Propanol | 1.0 | — | — | — | — | — | — | — |
| Accelerator[4] | 0.7 | 0.7 | 0.7 | 0.7 | 0.7 | 0.7 | 0.7 | 0.7 |
| Sulfur (80% oiled sulfur) | 5.0 | 5.0 | 5.0 | 5.0 | 5.0 | 5.0 | 5.0 | 5.0 |
| (Cured 40' at 160° C.) WIRE ADHESION TESTING Newtons at 121° C. | | | | | | | | |
| Unaged | 312.4 | 439.4 | 381.0 | 469.9 | 406.4 | 436.9 | 391.2 | 284.5 |
| Wire Coverage (Scale 0-5) | 3.0 | 5.0 | 5.0 | 5.0 | 5.0 | 5.0 | 4.5 | 2.0 |
| Aged 3 days (Steam) | 66.0 | 289.6 | 378.5 | 363.2 | 302.3 | 304.8 | 315.0 | 256.6 |
| % Retention | 21 | 66 | 99 | 77 | 74 | 70 | 81 | 90 |
| Wire Coverage | 0.0 | 5.0 | 4.5 | 5.0 | 3.5 | 3.0 | 2.5 | 2.0 |

REMARKS:
[1]2,3,5,6-Tetrachloro-1,4-benzoquinone.
[2]AP-1, 2,4-dichloro-6-(N-phenyl-p-phenylenediamino)-1,3,5-triazine.
AP-2, N-1,4-dimethylpentyl-N,N'-bis(4,6-dichloro-1,3,5-triazinyl-2)-p-phenylenediamine.
AP-3, 2-chloro-4,6-bis(N-1,4-dimethylpentyl-p-phenylenediamino)-1,3,5-triazine.
AP-4, 2-chloro-4,6-bis(N-phenyl-p-phenylenediamino)-1,3,5-triazine.
AP-5, 2-chloro-4,6-bis(N-sec-butyl-p-phenylenediamino)-1,3,5-triazine.
AP-6, Mixture of 2,4-dichloro-6-(N-1,4-dimethylpentyl-p-phenylenediamino)pyrimidine and 4,6-dichloro-2-(N-1,4-dimethylpentyl-p-phenylenediamino)pyrimidine.
[3]Resorcinol donor.
[4]N-t-butyl-2-benzothiazolesulfenamide.
Note:
Wire adhesion testing results are based on an average of five tests.

TABLE II

| | Example or Comparative Experiment | | | | |
|---|---|---|---|---|---|
| | A' | B' | 15 (AP-4) | 16 (AP-1) | 17 (AP-2) |
| Masterbatch | 172.0 | 172.0 | 172.0 | 172.0 | 172.0 |

TABLE II-continued

|  | Example or Comparative Experiment | | | | |
|---|---|---|---|---|---|
|  | A' | B' | 15 (AP-4) | 16 (AP-1) | 17 (AP-2) |
| Cobalt Stearate | 2.0 | — | — | — | — |
| Vulklor[1] | — | 1.0 | — | — | — |
| Adhesion Promoter (AP)[2] | — | — | 2.0 | 2.0 | 2.0 |
| Bonding Agent R-6[3] | — | 2.0 | — | — | — |
| Resin 1588 | 2.0 | — | — | — | — |
| 2-Nitro-2-methylpropanol | 1.0 | — | — | — | — |
| Accelerator[4] | 0.7 | 0.7 | 0.7 | 0.7 | 0.7 |
| Sulfur (80% oiled Crystex) | 5.0 | 5.0 | 5.0 | 5.0 | 5.0 |
| Cured at 150° C. (Corresponding to t '90 − 2 minutes) | 24' | 24' | 17' | 27' | 30' |
| Wire Adhesion Testing Newtons at 121° C. | | | | | |
| Unaged | 519.1 | 498.2 | 500.4 | 459.0 | 474.2 |
| Wire Coverage (0–5) | 5.0 | 5.0 | 3.5 | 5.0 | 5.0 |
| Aged 3 days (steam) | 49.1 | 387.9 | 405.7 | 426.1 | 405.2 |
| % Retention | 9 | 78 | 81 | 93 | 85 |
| Wire Coverage | 0.0 | 5.0 | 4.5 | 5.0 | 4.5 |
| Aged 2 days (121° C.) | 399.9 | 396.8 | 431.5 | 390.1 | 391.0 |
| % Retention | 77 | 80 | 86 | 85 | 82 |
| Wire Coverage | 5.0 | 5.0 | 4.0 | 5.0 | 5.0 |

In Table I, the percent of adhesion retention data (after three days steam aging at 100° C.) of Examples 9 through 14 inclusive which use the chloropyrimidines and chlorotriazines of this invention as the sole adhesion promoter versus the composition of Comparative Experiments A and B, which are commercially utilized adhesion promoter systems, illustrates the superior adhesion results unexpectedly realized via the use of chloropyrimidines and chlorotriazines of this invention in vulcanized rubber compositions.

Bonding Agent R-6 and Resin 1588 are resorcinol donors. As the percent adhesion retention data after three days steam aging at 100° C. indicates, compositions containing chloropyrimidines and chlorotriazines of this invention in combination with resorcinol-/acetaldehyde donor systems, i.e., Bonding Agent R-6 (Examples 9 through 14 inclusive), provide outstanding improved adhesion over that achieved with the commercially utilized adhesion promoter cobalt stearate or the Vulklor and resorcinol donor combination (Comparative experiments A and B, respectively).

Table II presents the results of certain of the preferred compounds of Structure (I) in the 100% natural rubber masterbatch. Examples 15–17 show that compared to the controls A. and B , the compounds of the invention show improved unaged adhesion. After steam aging, Examples 15–17 have better adhesion values and better % retention of adhesion than either control A' or B'. After two day aging at 121° C., Examples 15–17 shows improved % retention over control systems.

In conclusion, it is to be understood that all methods and rubber compounds disclosed herein fall within the scope of the claimed invention and that the subject invention is not to be limited by the examples set forth herein. As will be apparent to those skilled in the art, the formulation of the rubber composition can be varied within the scope of the total specification disclosure by selection of various rubbers of the type set forth herein as well as the amounts thereof, and of the chloropyrimidine and chlorotriazine adhesion promoters and it is believed that practice of the present invention can be determined without departing from the spirit of the invention herein disclosed and described, the scope of the invention being limited solely by the scope of the attached claims.

What is claimed:

1. A reinforced elastomeric composition produced by curing a blend comprising:
   a) vulcanizable rubber;
   b) brass coated metal reinforcement;
   c) sulfur or sulfur donor; and
   d) a compound represented by Structure (I)

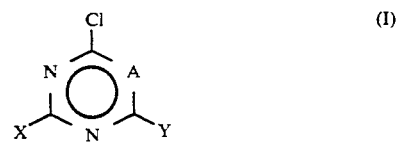

A is —N, C—H, C—Cl;
Y is

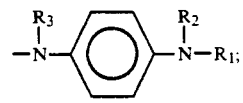

provided that X is Cl or

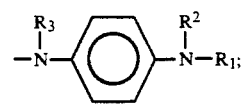

when A is —N, then X may also be —SH, —NH$_2$, —NHR$_4$; when A is C—H or C—Cl, Y may also be Cl only when X is

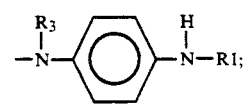

and wherein $R_1$ is $C_3$–$C_{12}$ alkyl or phenyl or $C_1$–$C_{12}$ alkyl-substituted phenyl;

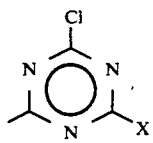

$R_2$ is H,
$R_3$ is H, $C_3$–$C_{12}$ alkyl
$R_4$ is $C_1$–$C_{12}$ alkyl.

2. The reinforced elastomeric composition of claim 1 wherein said blend further comprises a sulfur cure accelerator.

3. A reinforced elastomeric composition according to claim 2 wherein said blend is further characterized by:
   a) from about 0.05 to about 20 parts of a said compound represented by Structure (I);
   b) from about 0.2 to about 10.0 parts of said sulfur per 100 parts by weight of rubber; and
   c) from about 0.1 to about 5.0 parts of said sulfur cure accelerator per 100 parts by weight rubber being present therein.

4. A reinforced elastomeric composition according to claim 3 wherein said blend further comprises from about 0.05 to about 20 parts of at least one bonding agent selected from the group consisting of cobalt salts, 2,3,5,6-tetrachloro-1,4-benzoquinone, a resorcinol/formaldehyde donor and a resorcinol derivative.

5. The reinforced elastomeric composition of claim 2 wherein the sulfur cure accelerator is a benzothiazole sulfenamide, 2-mercaptobenzothiazole or benzothiazyl disulfide.

6. The reinforced, elastomeric composition of claim 4 wherein the bonding agent is a resorcinol derivative.

7. The reinforced, elastomeric composition of claim 1 wherein the vulcanizable rubber is selected from the group consisting of natural rubber, synthetic rubber, and blends thereof.

8. The reinforced, elastomeric composition of claim 1 wherein the compound of Structure (I) is further defined in that A is N or C—H and Y is

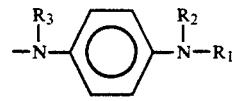

and X is Cl.

9. The reinforced, elastomeric composition of claim 1 wherein the compound of Structure (I) is further defined in that A is N, X is Cl and Y is $C_3$–$C_{12}$ alkyl substituted, phenyl substituted or dichlorotriazinyl substituted p-phenylenediamino.

10. The reinforced, elastomeric composition of claim 1 wherein said compound of Structure (I) is further defined in that A is N and R2 is dichlorotriazinyl.

11. The reinforced, elastomeric composition of claim 1 wherein said compound of Structure (I) is further defined in that A is N and X is Cl and Y is N-phenyl-p-phenylenediamino.

12. A process for producing a reinforced elastomeric composition which process comprises the steps of:
   A) preparing a blend comprising:
      a) vulcanizable rubber;
      b) brass coated metal reinforcement;
      c) from about 0.05 to about 20 parts of a compound of Structure (I);
      d) from about 0.2 to about 10.0 parts of sulfur per 100 parts by weight of rubber;
      e) from about 0.1 to about 5.0 parts of sulfur cure accelerator per 100 parts by weight rubber; and
   B) subjecting said blend to curing conditions.

* * * * *